2,713,064

Patented July 12, 1955

2,713,064

BIS-(TRIALKOXYSILYL)BENZENES AND THEIR USE

Donald R. Weyenberg, Midland, Mich., assignor to Dow Corning Corporation, Midland, Mich., a corporation of Michigan No Drawing. Application December 7, 1953,
Serial No. 396,728

5 Claims. (Cl. 260—448.8)

The present invention relates to novel alkoxy silanes and to their use as hydraulic fluids.

Certain properties are generally recognized as being required of fluids if they are to be successfully employed as hydraulic fluids. They should be physically and chemically stable. They should not react with the materials with which they will come into contact, that is, they should not cause corrosion of exposed metal parts and/or effect any substantial swelling of rubber parts. The viscosity of such fluids should remain within workable limits over a wide range of temperatures, and they should not display any tendency to gasify or solidify under extremes of high and low temperature. It is also important that the fluid show a high resistance to hydrolysis under the conditions of use, and it should display reasonably good lubricating qualities to prevent excessive wear of the exposed, moving metal parts.

Various silicon-containing compounds have been employed as hydraulic fluids in recent years. These fluids have displayed many of the desirable characteristics set forth above, but, generally, each has been deficient in some aspect or other. Thus, the silicate esters heretofore employed as hydraulic fluids are characterized by too great a variation in viscosity with variation in temperature and an unfortunate tendency to cause oxidation and corrosion of metallic surfaces exposed to the fluid. Other silicone fluids, such as dimethylpolysiloxanes, are lacking in the necessary lubricity.

The primary object of this invention is to provide a composition which displays all of the desirable qualities as hydraulic fluids heretofore recognized as being found in silicon-containing compounds and obviating the difficulties and deficiencies heretofore inherent in such silicon-containing compounds. Other objects and advantages of this invention are detailed in or will be apparent from the following description and appended claims.

This invention relates to bis-(trialkoxysilyl)benzenes having the formula $(RO)_3SiC_6H_4Si(OR)_3$ where R is a saturated, branched chain, aliphatic hydrocarbon radical of from 4 to 12 carbon atoms inclusive which are exceptionally useful as hydraulic fluids.

The compositions of this invention are predominantly mixed isomers of meta and para bis-(trialkoxysilyl)benzene. However, small amounts of the ortho bis-(trialkoxysilyl)benzene may be present in the said compositions without departing from the scope of the present invention. The said compositions have the general formula $(RO)_3SiC_6H_4Si(OR)_3$ where R represents saturated, branched chain, aliphatic hydrocarbon radicals of from and including 4 to 12 carbon atoms. Straight chain hydrocarbon radicals and hydrocarbon radicals of less than 4 carbon atoms are, for the most part, unsatisfactory because the molecule containing them is generally hydrolytically unstable. However, if in some of the molecules present, two of the three aliphatic hydrocarbon radicals attached through oxygen to the silicon atom are highly branched, for example, such radicals as tertiary butyl, tertiary amyl, and tertiary dodecyl, the third radical may be a saturated aliphatic hydrocarbon radical of less than 4 carbon atoms or any straight chain saturated, aliphatic hydrocarbon radical. The hydrolytic stability of such fluids is found to be satisfactory. It is preferred that the branches on the hydrocarbon radical be close to the oxygen atom which links the hydrocarbon to the silicon atom, specifically either on the alpha or beta carbon atom with respect to the oxygen. If the hydrocarbon radicals contain more than 12 carbon atoms, the viscosity-temperature index of the fluid is not satisfactory. Illustrative of the radicals which are operative in this invention are secondary butyl-, tertiary butyl-, secondary amyl-, tertiary amyl-, 2-ethylhexyl-, 5-butyloctyl-, secondary hexyl-, tertiary hexyl-, secondary dodecyl-, and tertiary dodecyl-.

It is to be understood that all of the alkoxy groups in the compounds of this invention can be the same, or the various alkoxy groups on the silicon can be different. Also, mixtures of two or more molecular species can be employed as hydraulic fluids.

The method of preparation of the compositions of this invention is not critical. The desired esters are obtained by the direct addition of an excess of the desired alcohols to bis-(trichlorosilyl)benzene at a temperature below 20° C. The resulting reaction may be summarized as follows:

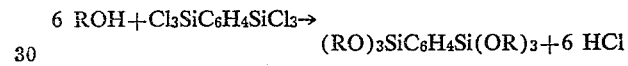

The resulting solution is neutralized, and the excess alcohol is stripped off. If necessary, the bis-(trialkoxysilyl)benzene is heated with carbon black to remove discoloration and is filtered while hot. Benzene may be employed as a solvent for the bis-(trichlorosilyl)benzene to facilitate stirring during the addition of the alcohol.

Alternatively, the esters may be prepared by the transesterification of bis-(trimethoxysilyl)benzene with the desired alcohol in the presence of an alkaline catalyst.

The viscosity-temperature characteristics of the bis-trialkoxysilyl)benzenes of this invention can be materially improved by blending into such fluids lower alkyl poly-siloxanes such as, for example, dimethylsiloxane, phenylmethylsiloxane, ethylmethylsiloxane, phenylethylsiloxane, diethylsiloxane, and mixtures and copolymers thereof. Said siloxanes may be added in any amount and may have any viscosity, but it is preferred that their use be restricted to 10 per cent or less by weight of the total fluid and that the viscosity of such siloxanes be at least 50,000 cs. at 25° C. It is to be understood, however, that the operability of the fluids of this invention, with respect to the viscosity-temperature characteristics, do not depend upon the addition of alkylpolysiloxanes, but are merely improved by such addition.

The following examples will serve to give those skilled in the art a better understanding of this invention. All of the examples are merely illustrative and are not to be construed as in any way limiting my invention, the scope of which is properly delineated in the appended claims. (All parts are parts by weight unless otherwise indicated.)

Example 1

Meta-bis-(tri-2-ethylhexyloxysilyl)benzene was prepared by adding an excess of 2-ethyl hexanol directly to meta-bis-(trichlorosilyl)benzene with constant stirring, at a temperature of approximately 15° C. The resulting reaction mixture was neutralized by bubbling NH3 through it. The unreacted alcohol was stripped off by heating to a temperature of 150° C. under reduced pressure of 2–5 mm. of mercury. The reaction product was heated with carbon black (a commercial grade available as "Nuchar") and was filtered while hot. This fluid was tested for its viscosity-temperature characteristics, lubricity, hydrolytic stability, and oxidative stability and was found to possess all the necessary physical properties for use as a hydraulic fluid.

Example 2

Employing the method of Example 1, meta-bis-(tri-secondary-butoxysilyl)benzene was prepared from butanol-2. The fluid product was tested and found equivalent to the fluid product of Example 1.

Example 3

Para-bis-(tri-secondary-butoxysilyl)benzene was prepared by adding an excess of butanol-2 directly to a benzene solution of para-bis-(trichlorosilyl)benzene with constant stirring at a temperature maintained below 20° C. throughout the addition. The resulting reaction mixture was neutralized by bubbling $N_2$ through the mixture heated to a temperature of between 80° C. and 110° C. until the HCl content was approximately 0.1% followed by refluxing with $NaHCO_3$ until neutral. The fluids were stripped to 150° C. at a pressure of from 2 to 5 mm. of mercury, thus removing the excess alcohol and the benzene solvent. The remaining reaction product was heated with carbon black and filtered while hot. This fluid filtrate was para-bis-(tri-secondary-butoxysilyl)benzene and upon testing was found to be satisfactory as a hydraulic fluid.

Example 4

Equivalent results were obtained employing the method of Example 3 to produce para-bis-(triisoamyloxysilyl)benzene from isoamyl alcohol.

Example 5

An ester was prepared by reacting a mixture of 30 mole per cent isoamyl alcohol and 70 mol per cent butanol-2 with meta-bis-(trichlorosilyl)benzene employing the method of Example 1. The reaction product was a mixture of isoamyloxy- and secondary-butoxy silyl benzenes which mixture had a pour point below —75° C., a freezing point below —75° C., excellent viscosity-temperature characteristics, excellent lubrication characteristics, excellent hydrolytic stability, and was in all ways satisfactory as a hydraulic fluid.

Example 6

Bis-(tritertiarybutoxysilyl)benzene was prepared by the following alkaline catalyzed transesterification reaction. 212 parts of bis-(trimethoxysilyl)benzene was placed in a distillation flask having a 2-foot fractionating column. 444 parts of tertiary butanol and .5 part of metallic sodium were added to the flask. The reaction mixture was distilled slowly between 65° C. and 120° C. at a pressure of 2 mm. of mercury. The excess tertiary butanol and methanol produced by the reaction were stripped off in this range of temperatures. The distillation was continued at 150° C. to 170° C. at a pressure of 2 to 3 mm. of mercury, and bis-(tritertiarybutoxysilyl)benzene was obtained as the distillate. This fluid was tested as a hydraulic fluid and was found to perform satisfactorily.

That which is claimed is:

1. A hydraulic fluid consisting essentially of bis-(trialkoxysilyl)benzene having the formula $$(RO)_3SiC_6H_4Si(OR)_3$$

wherein R is a saturated, branched chain, aliphatic hydrocarbon radical of from 4 to 12 carbon atoms.

2. As a composition of matter, bis-(trialkoxysilyl)benzene having the formula $(RO)_3SiC_6H_4Si(OR)_3$ wherein R represents any saturated, branched chain, aliphatic hydrocarbon radical of from 4 to 12 carbon atoms.

3. Meta-bis-(tri-2-ethylhexyloxysilyl)benzene.

4. Meta-bis-(tri-secondary-butoxysilyl)benzene.

5. Para-bis-(tri-secondary-butoxysilyl)benzene.

No references cited.